(12) United States Patent
Fletcher et al.

(10) Patent No.: US 10,339,882 B2
(45) Date of Patent: Jul. 2, 2019

(54) FAULT-TOLERANT AMLCD DISPLAY

(71) Applicant: L-3 COMMUNICATIONS CORPORATION, New York, NY (US)

(72) Inventors: Mark Fletcher, Cumming, GA (US); Carlos Galleno, Alpharetta, GA (US)

(73) Assignee: L-3 COMMUNICATIONS CORPORATION, New York, NY (US)

( * ) Notice: Subject to any disclaimer, the term of this patent is extended or adjusted under 35 U.S.C. 154(b) by 0 days.

(21) Appl. No.: 14/963,880

(22) Filed: Dec. 9, 2015

(65) Prior Publication Data

US 2017/0169769 A1 Jun. 15, 2017

(51) Int. Cl.
*G09G 3/36* (2006.01)
*G02F 1/1345* (2006.01)

(52) U.S. Cl.
CPC ....... *G09G 3/3648* (2013.01); *G02F 1/13452* (2013.01); *G02F 2201/506* (2013.01); *G09G 2330/08* (2013.01)

(58) Field of Classification Search
CPC .... G09G 3/36; G09G 2330/08; G02F 1/1368; G02F 2201/506
See application file for complete search history.

(56) References Cited

U.S. PATENT DOCUMENTS

| | | | | |
|---|---|---|---|---|
| 6,429,841 B1 * | 8/2002 | Lee | ...................... | G09G 3/3648 345/208 |
| 7,295,179 B2 | 11/2007 | Dunn | | |
| 7,728,788 B1 | 6/2010 | Echols | | |
| 9,478,162 B2 * | 10/2016 | Lee | ........................ | G09G 3/2092 |
| 9,837,006 B2 * | 12/2017 | Hwang | .................. | G09G 3/006 |
| 2001/0052888 A1 * | 12/2001 | Hebiguchi | ........... | G09G 3/3666 345/87 |
| 2005/0088386 A1 * | 4/2005 | Kao | .................... | G02F 1/13624 345/87 |
| 2007/0097018 A1 * | 5/2007 | Yamamoto | ........... | G09G 3/3666 345/1.3 |
| 2007/0176184 A1 * | 8/2007 | Lee | ..................... | H01L 27/3276 257/79 |
| 2009/0066622 A1 * | 3/2009 | Yang | .................... | G09G 3/3688 345/89 |

(Continued)

FOREIGN PATENT DOCUMENTS

KR          100462379          6/2005

*Primary Examiner* — Ricardo Osorio
(74) *Attorney, Agent, or Firm* — Dickinson Wright PLLC

(57) ABSTRACT

A fault-tolerant display system includes a TFT panel, a first driver couplet including a first gate driver and a first source driver, and a second driver couplet including a second gate driver and a second source driver. The first gate driver and the second gate driver feed into the LCD panel from opposite directions and the first source driver and the second source driver feed into the LCD panel from opposite directions. The first driver couplet and the second driver couplet each have their own independent power supplies, independent from one another. In this way, individual pixels of the LCD panel are driven simultaneously by two pairs of source drivers and gate drivers, such that if one of the driver pairs fails due to some fault, the other driver pair can continue to drive the LCD panel without loss of information despite the failure of the one driver pair.

15 Claims, 4 Drawing Sheets

(56) References Cited

U.S. PATENT DOCUMENTS

| | | | |
|---|---|---|---|
| 2010/0045708 A1* | 2/2010 | Higashino | G09G 3/3685 345/690 |
| 2010/0085292 A1* | 4/2010 | Chen | G09G 3/3688 345/92 |
| 2013/0176318 A1* | 7/2013 | Dunn | G09G 3/36 345/501 |
| 2014/0062986 A1* | 3/2014 | Huang | G09G 3/3696 345/212 |
| 2014/0085279 A1* | 3/2014 | Shiomi | G09G 3/2074 345/204 |
| 2014/0152930 A1* | 6/2014 | Lin | G02F 1/13624 349/42 |
| 2015/0109357 A1* | 4/2015 | Nakai | G09G 3/36 345/691 |
| 2016/0240117 A1* | 8/2016 | Xu | G09G 3/003 |
| 2017/0032744 A1* | 2/2017 | Yoo | G09G 3/3406 |
| 2017/0098421 A1* | 4/2017 | Son | G06F 3/1446 |
| 2017/0178576 A1* | 6/2017 | Zhu | G09G 3/3607 |

\* cited by examiner

FAULT-TOLERANT AMLCD DISPLAY

BACKGROUND

Fault-tolerant Active Matrix Liquid Crystal Displays (AMLCDs) are useful for flight-critical, primary aircraft cockpit displays where safety and high reliability are of the utmost importance for both military and commercial aircraft platforms. However, the desired fault tolerance presents significant challenges.

U.S. Pat. Nos. 7,295,179 and 7,728,788 both present possible approaches to fault tolerance through simple redundancy. U.S. Pat. No. 7,295,179 describes a liquid crystal display with two identical but totally electrically isolated left and right side displays residing on one single glass substrate. Under this arrangement, if a fault occurs in one side of the composite display (in one of the displays), the other side will still be operational. Thus, in this arrangement, the two displays can be driven to appear as one display and if one of the displays fails, the failing display is simply turned off and the other display continues (but with now only half of the total display area of the two displays working together). So in essence, a fault in the left or right (or top or bottom) portion of the composite display can be isolated to the left or the right (or top or bottom) portion and does not render the entire display unusable.

The approach put forward in U.S. Pat. No. 7,728,788 partitions the liquid crystal display into multiple sections which are driven by independent sources. Fault tolerance is achieved somewhat in that if one section fails, the remaining section(s) can remain operational.

The approach put forward in Republic of Korea patent 10-1999-0052420 adds data lines for the purpose of improving manufacturing yield and allows dual gate drive which helps overcome internal propagation delay times in the long axis of the display.

Unfortunately, if a fault occurs in the above solutions, typically there is some amount of the original (display) information lost, but the display system might yet still display enough information for the flight crew to return home safely.

SUMMARY OF THE INVENTION

In one example form, the present invention relates to a fault-tolerant AMLCD display system having a first driver couplet including a first gate driver and a first source driver, and a second driver couplet including a second gate driver and a second source driver. The first gate driver and the second gate driver feed into the AMLCD panel from opposite directions and the first source driver and the second source driver feed into the AMLCD panel from opposite directions. The pixels of the AMLCD panel are driven simultaneously by two pairs of source drivers and gate drivers, such that if one of the driver pairs fails due to some fault, the other driver pair can continue to drive the AMLCD panel without loss of information despite the failure of the one driver pair.

Optionally, the first driver couplet and the second driver couplet each have their own independent power supplies, independent from one another. Preferably, individual sub-pixels of the AMLCD panel are driven simultaneously by two pairs of source drivers and gate drivers, such that if one of the driver pairs fails due to some fault, the other driver pair can continue to drive the AMLCD panel without loss of information despite the failure of the one driver pair.

In another example form, the present invention relates to a fault-tolerant AMLCD display system comprising an AMLCD panel, a first driver pair including a first gate driver and a first source driver, and a second driver pair including a second gate driver and a second source driver. In this arrangement, individual pixels or sub-pixels of the AMLCD panel are driven simultaneously by the driver pairs, such that if one of the driver pairs fails due to some fault, the other driver pair can continue to drive the AMLCD panel without loss of information despite the failure of the one driver pair.

Preferably, the first gate driver and the second gate driver feed into the AMLCD panel from opposite directions and the first source driver and the second source driver feed into the AMLCD panel from opposite directions. Optionally, the AMLCD display panel has four edges and the gate drivers and the source drivers are fed into the AMLCD display panel along the four edges.

Preferably, the display panel comprises a thin film transistor (TFT) display.

In another example form the present invention preferably comprises a fault-tolerant AMLCD display system including an AMLCD panel, at least one gate driver, and at least two source drivers.

Advantageously, the present invention provides improved, superior redundancy, by driving the pixels and/or sub-pixels redundantly. This pixel-level redundancy allows for full screen operation even with individual faults. Thus, a single-point of failure condition is avoided and the display panel (be it an AMLCD or other TFT-based display) can still provide all of the original information presented prior to the occurrence of the fault.

BRIEF DESCRIPTION OF THE DRAWING FIGURES

DETAILED DESCRIPTION OF THE EXAMPLE EMBODIMENTS

Figure 1:
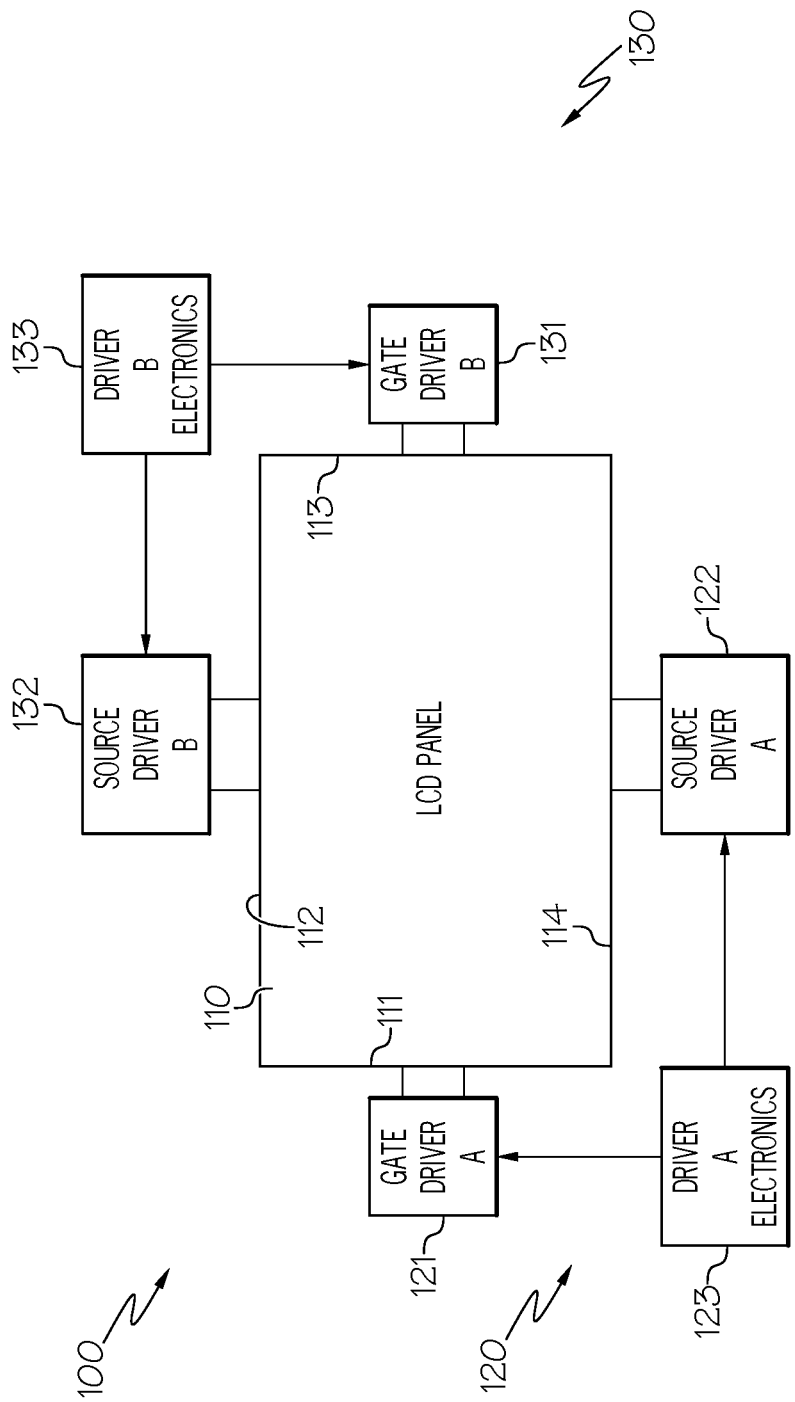
FIG. 1 is a schematic illustration of a fault-tolerant display system according to a preferred example form of the present invention, showing an AMLCD display panel having its pixels driven concurrently by two separate driver sets.

Referring now in detail to the drawing figures, where like reference numerals represent like parts throughout the several views, FIG. 1 shows a fault-tolerant display system 100 according to a preferred example form of the present invention, showing an AMLCD display panel 110 having its pixels driven concurrently by two separate driver sets 120, 130. Preferably, the display panel 110 comprises a TFT display (thin film transistor). Although an AMLCD panel is shown, the fault-tolerant display system can also be another other type of display, such as OLED, electrophoretic, QLED, micro-LED, etc.).

The first driver set 120, designated on the figure as the "A" driver set, includes a Gate Driver A designated at 121, a Source Driver A designated at 121, and associated A driver electronics designated at 123. Likewise, the second driver set 130, designated on the figure as the "B" driver set, includes a Gate Driver B designated at 131, a Source Driver B designated at 131, and associated B driver electronics designated at 133.

The first (A) gate driver 121 and the second (B) gate driver 131 feed into the AMLCD panel 110 from opposite directions and the first (A) source driver 122 and the second (B) source driver feed 132 into the AMLCD panel 110 from opposite directions. In particular, the AMLCD panel 110 optionally has four edges 111, 112, 113, and 114 and the gate drivers 121, 131 and the source drivers 122, 132 are fed into the AMLCD display panel 110 along the four edges 111-114.

Figure 2:
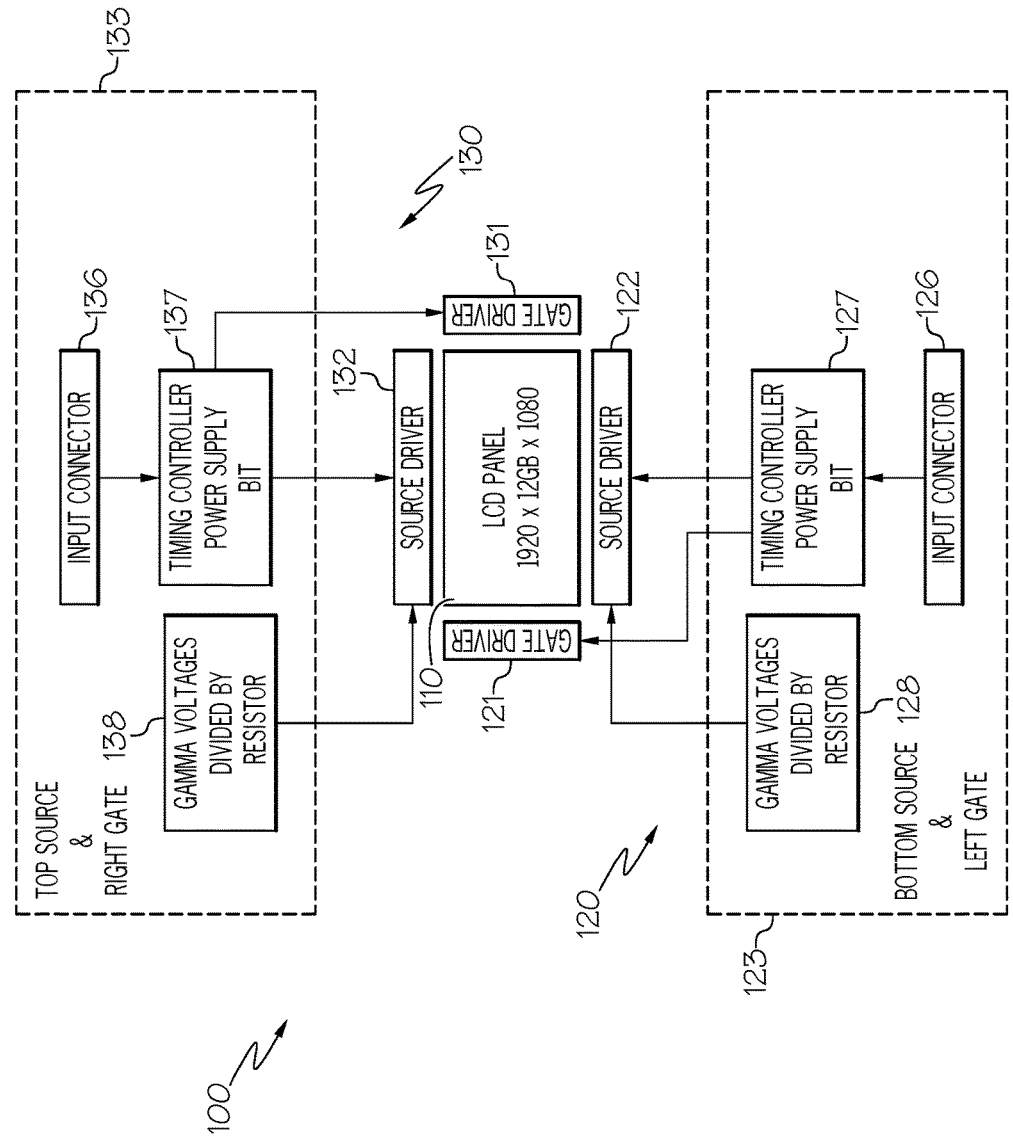
FIG. 2 is a more detailed schematic illustration of the fault-tolerant display system of FIG. 1.

As shown in FIG. 2, in an optional form the display panel 110 can be a TFT display having a typical horizontal resolution of 1920 each red, green, and blue subpixels in each line and a typical vertical resolution of 1080 lines (1920×RGB×1080). Also, the A driver electronics 123 can include an input connector 126, the timing controller, power supply, and built in test (BIT) functions 127, and the gamma voltage divider function 128. The input connector 126 electrically couples the digital video input signal (LVDS, DisplayPort, MIPI, etc.) to the timing controller and power supply 127. In turn, timing controller power supply 127 is coupled to the A gate driver 121 and to the A source driver 122. The gamma voltage divider function 128 is connected to the A source driver 122.

Similarly, the B driver electronics 133 can include an input connector 136, the timing controller, power supply, and built in test (BIT) functions 137, and a gamma voltage divider function 138. The input connector 136 electrically couples the digital video input signal (LVDS, DisplayPort, MIPI, etc.) to the timing controller and power supply 137. In turn, the timing controller power supply 137 is coupled to the B gate driver 131 and to the B source driver 132. The gamma voltage divider function 138 is connected to the B source driver 132.

Inasmuch as the two driver pairs 120, 130 each have their own independent power supply (see 127, 137), they each have their own $V_{com}$.

Figure 3:
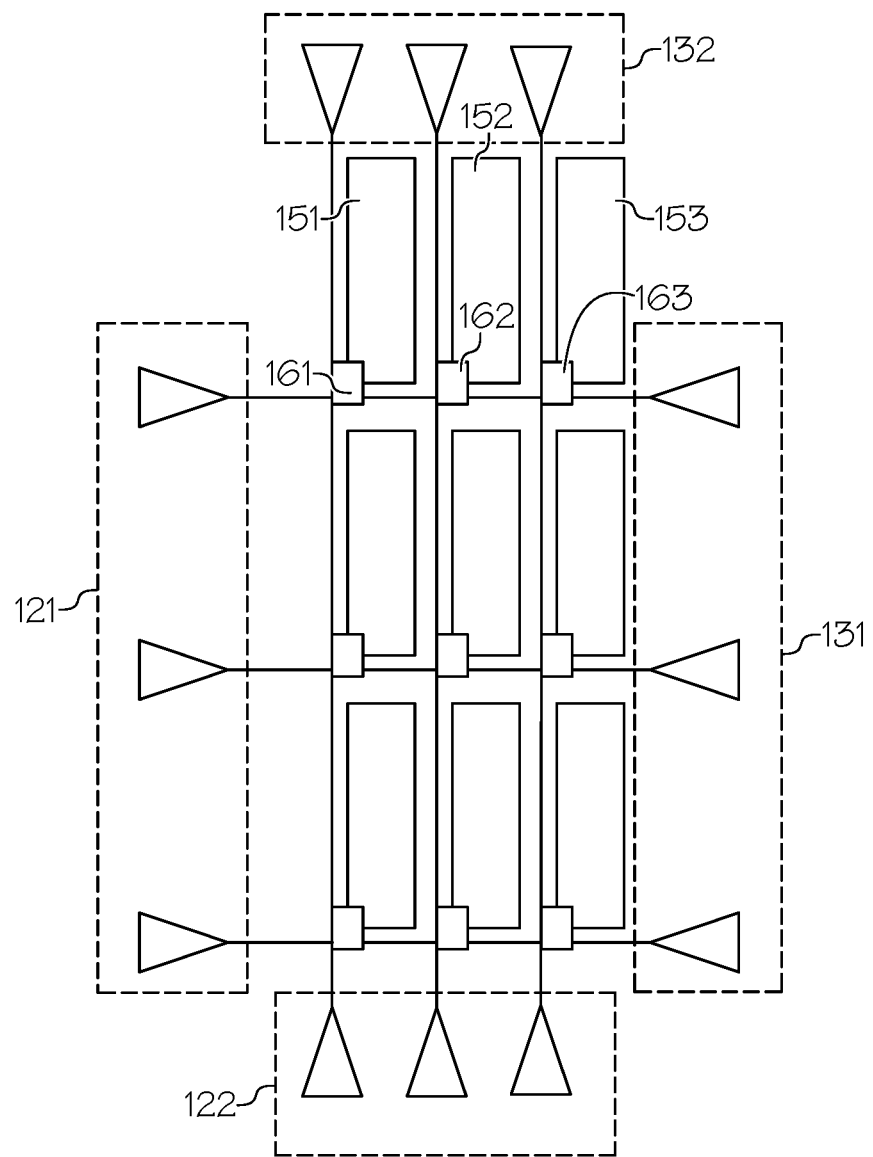
FIG. 3 is a detailed schematic illustration of the fault-tolerant display system of FIG. 1, showing how, on a pixel level (or sub-pixel level), the pixels of the AMLCD display are driven by separate driver sets.

Advantageously, the present invention provides improved, superior redundancy, by driving the pixels redundantly. This pixel-level redundancy allows for full screen operation even with individual faults. Thus, a single-point of failure condition is avoided and the display panel (be it an AMLCD or any TFT-based display) can still provide all of the original information presented prior to the occurrence of the fault. In the context of an RGB display panel, the pixel-level redundancy can be viewed as a sub-pixel level redundancy. Indeed, as shown in FIG. 3, the red-green-blue subpixels, such as sub-pixels 151, 152, 153 are each switched by their corresponding transistors 161, 162, 163. The transistors are operated by the drivers. As seen in this illustration, each transistor is redundantly driven by two gate drivers (121, 131). Also, each transistor is redundantly driven by two source drivers (122, 132). Thus, if one of the gate drivers fails, the other is sufficient to continue to drive the transistor. Likewise, if one of the source drivers fails, the other is likewise sufficient to drive the transistor. Thus, despite the fact that a fault might be detected in a gate driver or a source driver, the panel can be operated as normal. If a fault is detected in a gate driver, preferably one would turn off the fault-laden gate driver and operate with only the other, non-faulty gate driver. Likewise, if a fault is detected in a source driver, preferably one would turn off the fault-laden source driver and operate with only the other, non-faulty source driver.

Figure 4:
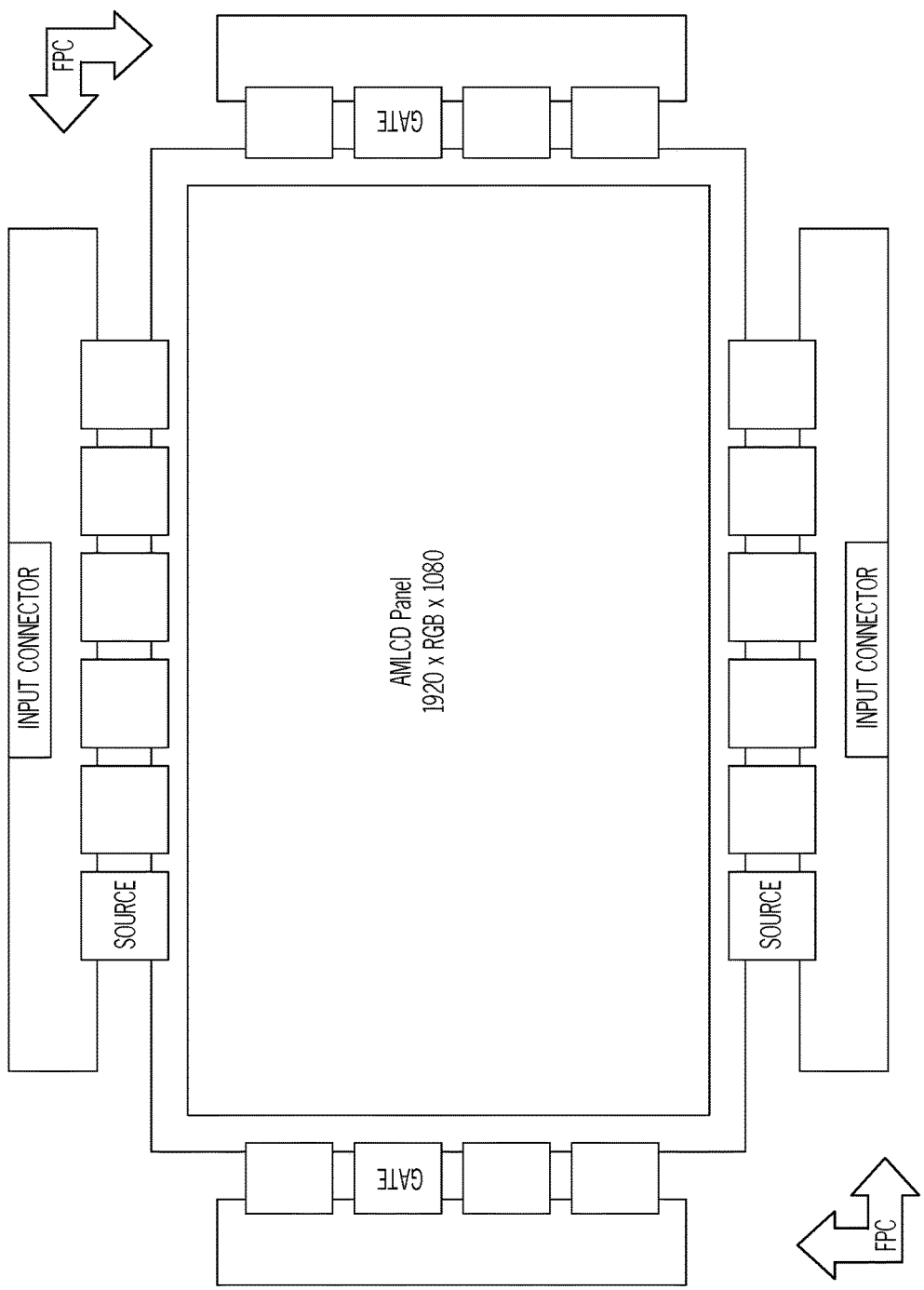
FIG. 4 is a schematic illustration of a fault-tolerant display system according to another preferred example form of the present invention, showing a typical implementation of the physical layout of the fault tolerant AMLCD display panel.

FIG. 4 shows a typical example of the physical layout of the fault tolerant display which illustrates the two driver sets (each consisting of driver electronics, source drivers and gate drivers connected together via a flex printed circuit (FPC)) located external to the AMLCD panel. Alternate configurations of this invention may incorporate either some or all of the components of the two driver sets (driver electronics, source drivers, gate drivers, etc.) located directly on the AMLCD or other TFT-based display panel.

Advantageously, these arrangements provide both maximum availability of the display and maximum integrity of the data/images displayed thereon. In aircraft applications, this can be critically important.

It is to be understood that this invention is not limited to the specific devices, methods, conditions, or parameters described and/or shown herein, and that the terminology used herein is for the purpose of describing particular embodiments by way of example only. Indeed, these examples are not intended to be all-inclusive of the possible implementations of this invention. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A fault-tolerant LCD display system comprising: an LCD panel; a plurality of pixels of the LCD panel; a first driver couplet including a first gate driver and a first source driver; a second driver couplet including a second gate driver and a second source driver; a first gamma voltage divider function connected to the first source driver; a second gamma voltage divider function connected to the second source driver; wherein the first gate driver and the second gate driver feed into the LCD panel from opposite directions and wherein the first source driver and the second source driver feed into the LCD panel from opposite directions; and wherein each individual pixel of said plurality of pixels is driven simultaneously by the first driver couplet and the second driver couplet, such that if the first gate driver fails, the first source driver and the second driver couplet continue to drive the LCD panel.

2. The fault-tolerant LCD display system of claim 1, wherein the first driver couplet and the second driver couplet each have their own independent power supplies, independent from one another.

3. The fault-tolerant LCD display system of claim 1, wherein the LCD panel comprises a thin film transistor display.

4. The fault-tolerant LCD display system of claim 1, wherein the LCD panel has first and second edges opposite each other and third and fourth edges opposite each other, and wherein the first and second gate drivers feed the LCD panel through the first and second opposite edges and the first and second source drivers feed the LCD panel through the third and fourth opposite edges.

5. The fault-tolerant LCD display system of claim 1, wherein if one of the first gate driver, the first source driver, the second gate driver, and the second source driver fails due to some fault, the other drivers continue to drive the LCD panel without loss of information despite the failure of the one driver.

6. The fault-tolerant LCD display system of claim 1, wherein if the first gate driver and the second source driver fail due to some fault, the other drivers continue to drive the LCD panel without loss of information despite the failure of the two drivers.

7. The fault-tolerant LCD display system of claim 1, wherein if the second gate driver and the first source driver fail due to some fault, the other drivers continue to drive the LCD panel without loss of information despite the failure of the two drivers.

8. A fault-tolerant LCD display system comprising: an LCD panel; a plurality of pixels of the LCD panel; a first driver pair including a first gate driver and a first source driver; a second driver pair including a second gate driver and a second source driver; a first gamma voltage divider function connected to the first source driver; a second gamma voltage divider function connected to the second source driver; and wherein each individual pixel of the plurality of pixels is driven simultaneously by the first driver pair and the second driver pair, such that if the first source driver fails due to some fault, the first gate driver and the second driver pair continue to drive the LCD panel without loss of information despite the failure of the first source driver.

9. The fault-tolerant LCD display system of claim 8, wherein the first driver pair and the second driver pair each have their own independent power supplies, independent from one another.

10. The fault-tolerant LCD display system of claim 8, wherein the LCD panel comprises a thin film transistor display.

11. The fault-tolerant LCD display system of claim 8, wherein the LCD panel has first and second edges opposite each other and third and fourth edges opposite each other, and wherein the first and second gate drivers feed the LCD panel through the first and second opposite edges and the first and second source drivers feed the LCD panel through the third and fourth opposite edges.

12. A fault-tolerant LCD display system comprising: an LCD panel; a plurality of pixels of the LCD panel; at least two gate drivers; at least two source drivers; a first gamma voltage divider function connected to a first source driver of the at least two source drivers; and a second gamma voltage divider function connected to a second source driver of the at least two source drivers; wherein each individual pixel of said plurality of pixels is driven simultaneously by the at least two gate drivers and the at least two source drivers, such that if one of the at least two gate drivers fails, the other gate driver and the at least two source drivers continue to drive the LCD.

13. The fault-tolerant LCD display system of claim 12, further comprising two independent power supplies for the source drivers, independent from one another.

14. The fault-tolerant LCD display system of claim 12, wherein the LCD panel comprises a thin film transistor display.

15. The fault-tolerant LCD display system of claim 12, wherein if one of the at least one gate driver and the at least two source drivers fails due to some fault, the other drivers continue to drive the LCD panel without loss of information despite the failure of the one driver.

* * * * *